United States Patent
Keeley et al.

[11] Patent Number: 5,446,847
[45] Date of Patent: Aug. 29, 1995

[54] PROGRAMMABLE SYSTEM BUS PRIORITY NETWORK

[75] Inventors: James W. Keeley, Nashua, N.H.; George J. Barlow, Tewksbury; Richard A. Lemay, Carlisle, both of Mass.

[73] Assignee: Bull HN Information Systems Inc., Billerica, Mass.

[21] Appl. No.: 531

[22] Filed: Jan. 4, 1993

Related U.S. Application Data

[63] Continuation of Ser. No. 771,584, Oct. 4, 1991, abandoned.

[51] Int. Cl.6 ............... G06F 13/18; G06F 13/372
[52] U.S. Cl. ........................ 395/280; 364/DIG. 1; 364/229; 364/230; 364/230.1; 364/231.4; 364/240; 364/242.6; 364/242.8; 364/242.95; 364/271.5; 395/550
[58] Field of Search ............... 395/325, 725, 275, 200, 395/550, 425

[56] References Cited

U.S. PATENT DOCUMENTS

| | | | |
|---|---|---|---|
| 4,423,384 | 12/1983 | DeBock | 307/243 |
| 4,494,192 | 1/1985 | Lew | 395/325 |
| 4,779,089 | 10/1988 | Theus | 395/325 |
| 4,901,226 | 2/1990 | Barlow | 395/325 |
| 4,987,529 | 1/1991 | Craft | 395/325 |
| 4,998,030 | 3/1991 | Cates | 307/518 |
| 5,015,871 | 5/1991 | Sirabella | 307/269 |
| 5,150,466 | 9/1992 | Barlow et al. | 395/325 |

Primary Examiner—Jack B. Harvey
Assistant Examiner—Ayaz R. Sheikh
Attorney, Agent, or Firm—Faith F. Driscoll; John S. Solakian

[57] ABSTRACT

A bus interface priority network provides access to a system bus by a plurality of different types of requestors as a function of the types of transactions they are required to process. The network includes programmable circuit for identifying the type of requestor and selecting a delay for accessing the system bus on the basis of requestor type thereby eliminating the need to adjust timing to the slowest requestor.

11 Claims, 5 Drawing Sheets

PROGRAMMABLE SYSTEM BUS PRIORITY NETWORK

RELATED APPLICATION

This is a continuation of application Ser. No. 07/771,584 filed on Oct. 4, 1991, now abandoned.

The patent application of James W. Keeley entitled, "Bus Interface State Machines," filed on Oct. 4, 1991, bearing Ser. No. 07/771,712, which is assigned to the same assignee as this patent application.

BACKGROUND OF THE INVENTION

1. Field of Use

The present invention relates to bus systems and, more particularly, to bus priority networks.

2. Prior Art

Prior systems provided a distributed priority network for resolving bus access among different requestors on a priority basis. An example of such a system is found in the patent application of George J Barlow, et al entitled, "Flexible Distributed Bus Priority Network, Ser. No. 07/593,436, filed on Oct. 5, 1990 which is now a U.S. Pat. No. 5,150,466.

Where an interface was shared between two types of requestors, the timing was adjusted to the rate of the slowest requestor. More specifically, the delays were set to different amounts depending upon whether the requestor was a central processing unit (CPU) or a memory unit to ensure proper priority resolution. An example of such a system is disclosed in U.S. Pat. No. 4,901,226.

When the number of different requestors which can share a common bus interface is increased, it becomes difficult to establish delays without a substantial increase in complexity. Moreover, the timing adjustment to the slowest requestor reduces overall system performance. Also, the prior approach is not readily adaptable to change in the number and type of requestors sharing a common interface.

Accordingly, it is a primary object of the present invention to provide a high performance priority network interface.

SUMMARY OF THE INVENTION

The above and other objects of the present invention are achieved in a preferred embodiment of the bus interface priority network which includes means for identifying the type of requestor and selecting the delay on the basis of requestor type. The priority network further includes a number of programmable array logic circuits which are programmed to provide delays for the different types of requestors so as to enable on the fly selection as a function of the selected requestor. The bus interface priority network also includes logic circuits for resolving priority among requestors in the case of simultaneous requests according to a predetermined priority.

The bus interface priority network of the present invention enhances system performance by eliminating the need to adjust timing to the slowest requestor. Also, it provides flexibility and can be used by any type of unit.

DETAILED DESCRIPTION OF THE PREFERRED EMBODIMENT

Figure 1:
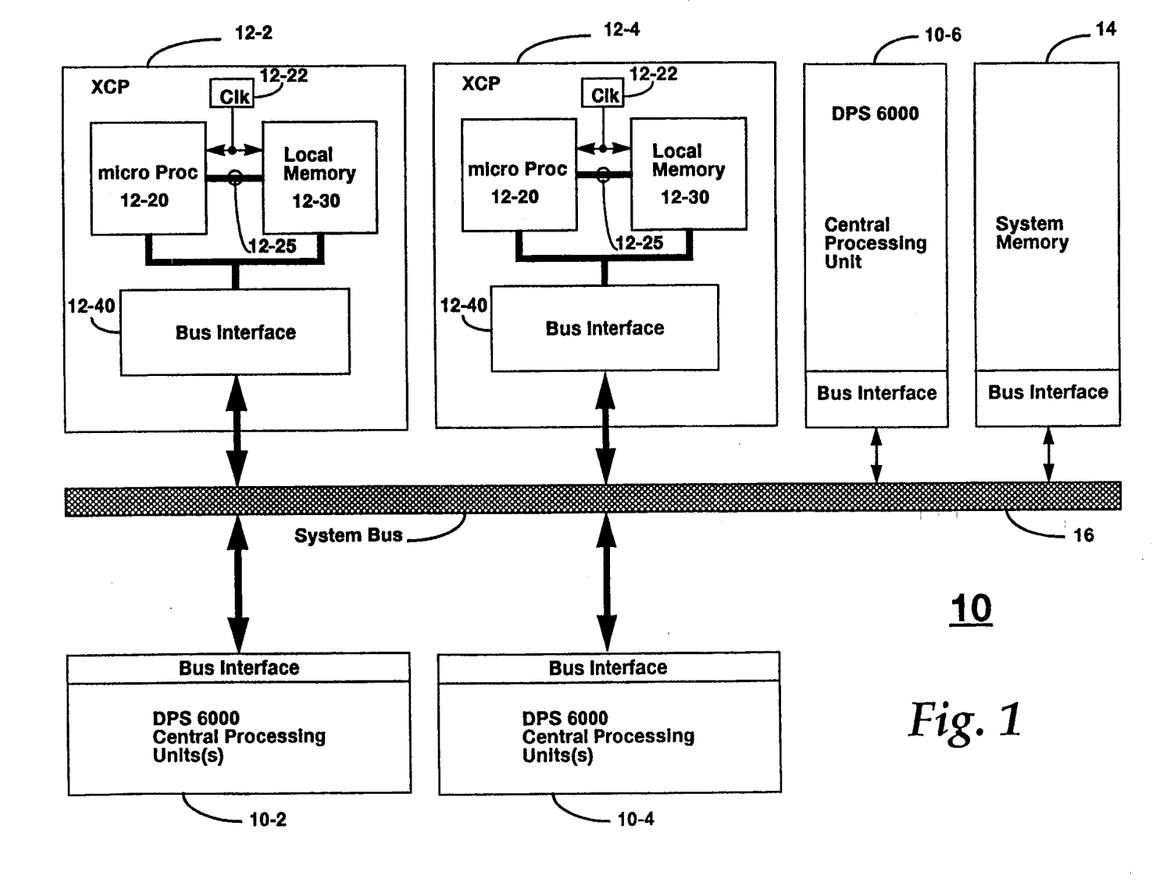
FIG. 1 is a block diagram of a multiprocessor system which includes the bus interface priority network of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40 as shown. The microprocessor 12-20 and local memory 12-30 are tightly coupled through a local processor bus 12-25. Clock generator circuits 12-22 generate a single frequency clock signal CLKREF of 33 MHz which provides the fundamental timing and internal operating frequency for microprocessor 12-20, in addition to all of the other circuits which make up processor 12-2. The microprocessor 12-20 is a high performance 32-bit processor which operates at clock speeds of up to 33 MHz and in the preferred embodiment corresponds to an Intel 80486 chip. The Intel 80486 chip includes a microprocessor, a floating point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
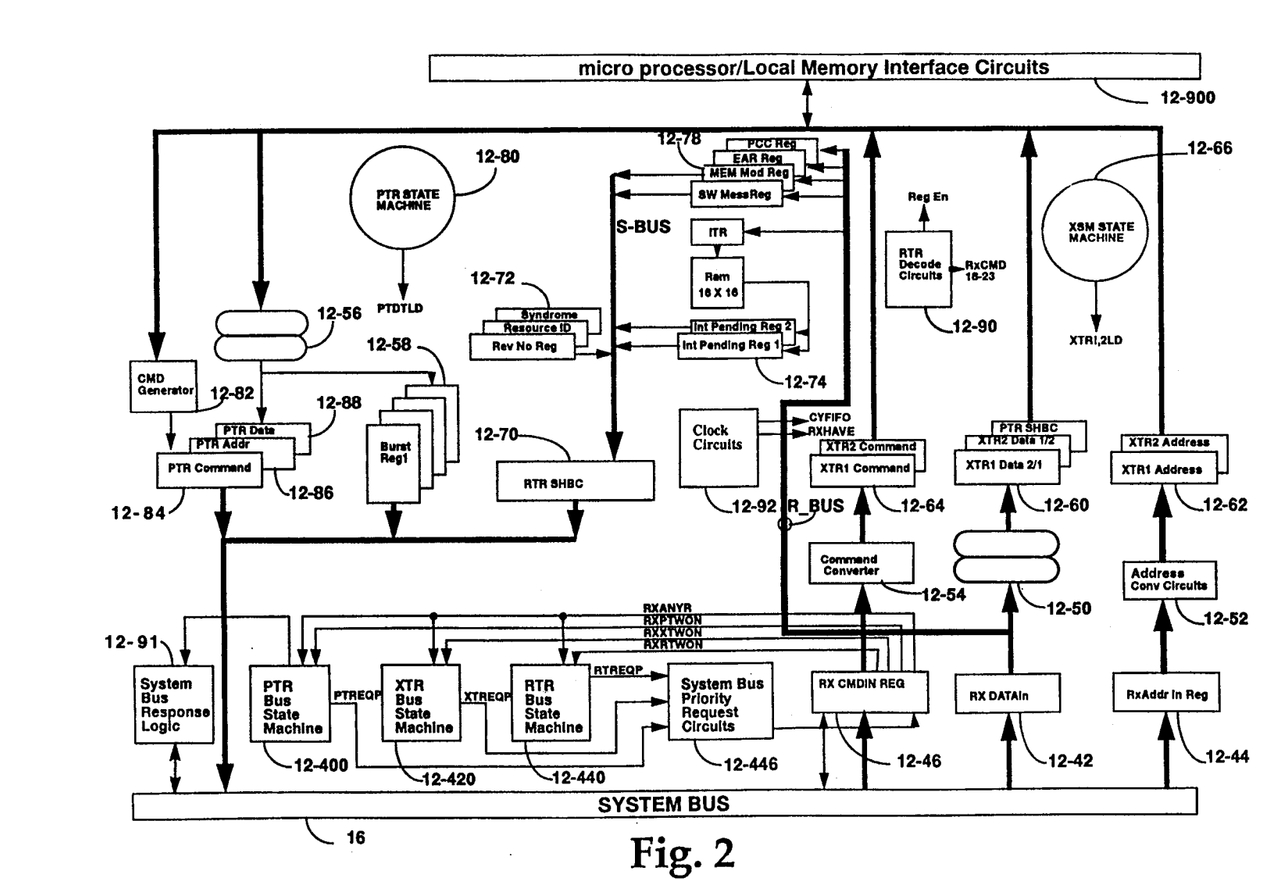
FIG. 2 is a block diagram of a processing unit which includes the bus interface priority network of the present invention.

Description of FIG. 2

FIG. 2 shows in greater detail, a portion of the onboard processor 12-2 of FIG. 1. In the preferred embodiment, the microprocessor 12-20 and local memory 12-30, along with associated control circuits, in addition to clock generation circuits of block 12-22, are contained on a single daughter board which couples to the interface circuits of block 12-900. The bus interface circuits, sets of command, address and data registers and state control circuits are contained on the mother board. These two boards make up the entire processor.

Each external request received from system bus 16 to access local memory 12-30 which has been acknowledged by the system bus response logic circuits, not shown, is loaded into the corresponding receive data, address and command registers 12-42 through 12-46 in response to an enable signal CYCREQ generated by clock logic circuits of block 12-92. The address and command signals are converted into the appropriate form by address and command converter circuits of blocks 12-52 and 12-54 and stored in available registers of the two sets of queue registers of blocks 12-62 and 12-64, in response to signal CYFIFO. Thereafter, the stored address and command signals are applied to the processor bus via the interface circuits of block 12-900, in response to an enabling signal EADQTP. Additionally, the bus command signals are applied to the system bus response logic circuits of block 12-91, Any data associated with a request loaded into register 12-42 is reordered as required by the programmable array logic (PALs) of block 12-50 and stored into the appropriate one of the register of block 12-60. The different bytes of the data words are swapped from the so-called big endian format of the system bus to the little endian format utilized by microprocessor 12-20. This is accomplished by the byte swap circuits included in block 12-900 which is implemented by the proper reordering of connector pin connections.

The XSM state machine 12-66 generates the required control signals for executing external memory read and write requests. In response to an input signal RXHAVE received from the circuits of block 12-90, which indicates the receipt of a memory request, the XSM state machine 12-66 loads the request into one of the sets of registers of the two level queue. It also enables transfer of the memory request via signal EADQTP to local memory 12-30 via the local bus in the same form as those memory requests made by microprocessor 12-20. Also, the XSM state machine 12-66 generates the required signals for transferring local memory data to system bus 16 via data swap circuits 12-56 and a set of registers of an array 12-58.

A processor state machine control block 12-80 controls the processing of transactions or requests initiated by microprocessor 12-20. As shown, commands generated by 12-20 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively. This is all done in response to an enabling load signal PTDTLD generated by state machine 12-80.

The processing unit 12-2 further includes a plurality of system visible registers which are accessible via system bus 16 by microprocessor 12-20 or by any other system bus unit. A number of these registers connect in common to a receive bus (R Bus), as shown, for receiving input data from the RX DATA IN register 12-42.

These registers include a processor control command register (PCC) which comprises a plurality of flip-flop register stages, an EEPROM address register (EAR), a memory module register (MMR), a software message register (SMR), a pair of interrupt pending registers (IPR0 and IPR1) which serve as the output registers of an interrupt store (IPS) random access memory (RAM) 12-76 loadable from the R Bus by an interrupt register (ITR). As shown, the SMR, MMR, IPR0 and IPR1 registers also connect in common to a send bus (S Bus) for reading out of their contents to system bus 16 via a receive transfer second half bus cycle register (RTSHBC) 12-70.

Other system visible registers whose contents are only read, also connect in common to the S Bus. These registers include a syndrome register (SYN), a resource identification register (ID) and a revision number register (REV). The ID and REV registers which store constant values in addition to the MMR register are implemented in a programmable array logic (PAL) circuit while the other registers are implemented using standard register circuits.

The system visible registers are accessed in response to I/O commands applied to system bus 16 which results in the storing of address and command signal in registers 12-44 and 12-46. The address and command signals are decoded by the decode circuits of the RTR Control block 12-90. The system visible registers are described in greater detail in the Appendix.

As seen from FIG. 2, the processing unit 12-2 in accordance with the present invention includes three independently operated state machines 12-400, 12-420 and 12-440 which enable the simultaneous execution of different types of transactions. Each state machine connects to system bus 16 via receive command register 12-46 and is responsible for completing all aspects of a specific type of transaction (e.g. wait, retry conditions). Also PTR state machine 12-400 connects to the system bus circuits of block 12-91.

Also, each state machine connects to the system bus priority request circuits of block 12-460 which grants each state machine access to system bus 16 in response to request signals PTREQP, XTREQP, and RTREQP on a priority basis defined by the states of signals RXPTWON, RXXTWON, and RXRTWON, in addition to signal RXANYR.

Additionally, state machines 12-400, 12-420, and 12-440 receive input control signals from the processor state machine (PSM) state machine 12-80, external state machine (XSM) 12-66 and the RTR control circuits of block 12-90 respectively. These signals initiate the processing of the different types of transactions following the loading of the pertinent registers with command, address and data as appropriate.

Figure 3:
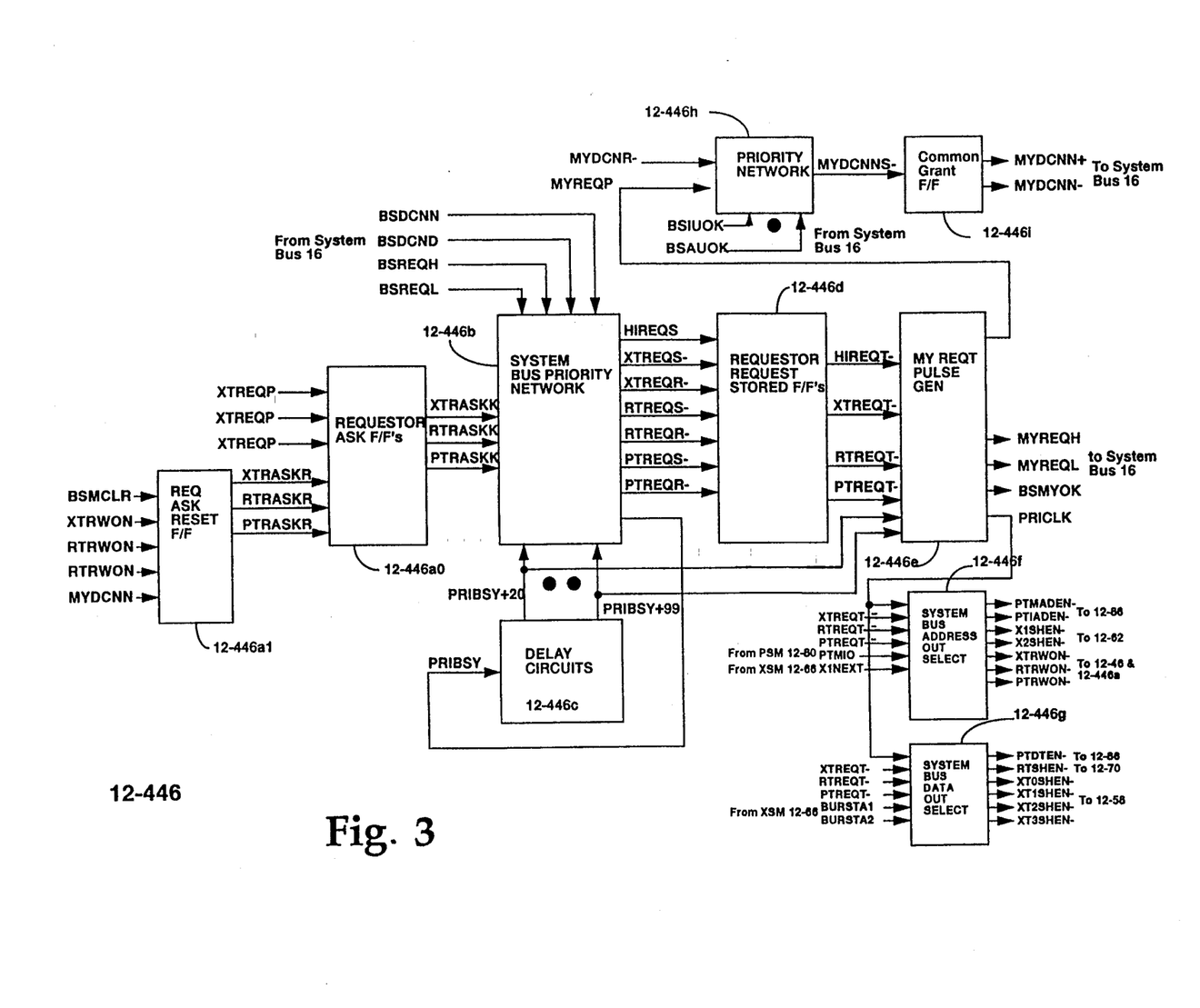
FIG. 3 shows in block diagram form, the bus interface priority network of the present invention.

Description of FIG. 3

FIG. 3 shows in block diagram form, the system bus priority network circuits 12-446. As discussed, the network 12-446 serves as the interface between system bus 16 and the three requestor units corresponding to state machines 12-400, 12-420 and 12-440 which process different types of transactions. As shown, the circuits include an input request section which includes a first plurality of requestor ask flip-flops of block 12-446a0 and a second plurality of flip-flops of block 12-446a1 which provide reset clear signals at the end of a system bus cycle of operation. The circuits of block 12-446a0 couple to the state machines 12-400, 12-420 and 12-440 for receiving request signals XTREQP, RTREQP, and PTREQP.

In response to the request signals, the flip-flops of block 12-446a generate a corresponding number of output request signals XTASKK+, RTASKK+ and PTASKK+. These signals are applied as inputs to the system bus priority network circuits of block 12-446b which also receives as inputs, bus data cycle now signal BSDCNN+, bus data cycle now delayed signal BSDCND+ and external high priority and low priority request signals, BSREQH+ and BSREQL+ from system bus 16. The signals BSREQH+ and BSREQL+ indicate the start of a system bus priority resolution cycle of operation.

The states of these signals indicate the type of cycle and which requestor is going to win access to the system bus. The network circuits of block 12-446b also receive a plurality of timing delay signals PRIBSY+20 through PRIBSY+99 from delay line circuit 12-446c which receives as an input, priority busy signal PRIBSY+. The delay signals are used to ensure a glitch free set of output pulses. As shown in FIG. 3, the priority network circuits 12-446b generate output request signals HIREQS through PTREQR— in addition to priority busy signal PRIBSY+ which is applied to PAL delay circuit 12-446c.

The resulting request signals are applied as inputs to a corresponding number of requestor request stored flip-flops of block 12-446d which provide as outputs, request signals HIREQT, XTREQT—, RTREQT—, and PTREQT—.

The request signals are applied to the my request pulse generator circuits of block 12-446e which also receive the delay signals PRIBSY+20 through PRIBSY+99. The amount of delays are preselected to establish the proper time delays for placing requests on system bus 16 relative to the type of requestor. This permits different delays to be associated with the specific types of requestors relative to the types of transactions they are required to execute. This enables the access time of any requestor to system bus 16 to be held to a minimum In the preferred embodiment, the priority network circuits 12-446e include a programmable array logic (PAL) which is programmed so as to select the desired amount of delay to be associated with each of the requestors. For example, if the requestor is a memory unit, the normal required delay is 100 nanoseconds for accessing system bus 16 since such units normally issue such requests ahead of time. Other types of units, such as central processing units, require a delay of 30 nanoseconds to access system bus 16 since such units operate as low priority units.

The my request pulse generator circuits 12-446e generate as outputs, my request signal MYREQP, my high and low request signals MYREQH+ and MYREQL+, system bus my request OK signal BSMYOK+ and priority clock signal PRICLK+. The signals MYREQH+ and MYREQ1+ are applied to system bus 16 as signals BSREQH+ and BSREQL+. The signal BSMYOK+ is programmed to be generated as a function of which state machine requestor was granted access to the bus (i.e., the winner of the bus).

Signal PRICLK+ is used as a timing signal and is applied to the system bus address out select circuits of block 12-446f and to the system bus data out select circuits of block 12-446g. The my request signal MYREQP is applied to the priority network input circuit 12-446h which connects to the nine distributed priority network lines for receiving positional bus priority signals BSIUOK+ through BSIAUOK+ from the higher priority positioned boards. The circuit 12-446h also receives my data cycle now reset signal MYDCNR— and, in response to these inputs, generates my data cycle now set signal MYDCNS— which is used to set the common requestor grant flip-flop of block 12-446i. This results in the generation of my data cycle now grant signals MYDCNN+ and MYDCNN— which are in turn applied to system bus 16 in addition to the system bus input response circuits of block 12-90.

As shown, the system bus address out select circuits 12-446f and the system bus data out select circuits 12-446g also receive state machine request signals XTREQT—, RTREQT— and PTREQT— from circuits 12-446d in addition to signals PTMIO+, X1NEXT+, BURSTA1 and BURSTA2 from different ones of the state machines 12-66 and 12-80. The signals PTMIO, X1NEXT, BURSTA1 and BURSTA2 define the type of cycle (i.e., I/O or memory), the queue storing the address type (X1NEXT) and the address of the burst data register whose contents are being transferred (BURSTA1, A2).

Each of the circuits 12-446f and 12-446g are programmed to resolve priority conflicts among the three requestors according to a preestablished priority scheme. That is, the priorities for simultaneously generated requests are allocated in the order of high to low priority XTR, RTR and PTR requests.

These circuits generate all of the required address and data enable signals for transferring the transaction address and data to system bus 16 of the selected requestor at a time which is synchronized with the system bus priority resolution operation. This permits the synchronous selection of tristate bus register sources without any tristate overlap.

Additionally, the circuits 12-446f generate signals XTRWON, RTRWON and PTRWON for indicating which of the three requestors was granted access to system bus 16. These signals are applied as inputs to the state machines 12-400, 12-420 and 12-440, and to the request ask reset flip-flops of block 12-446a1. Upon the receipt of my data cycle now signal MYDCNN+ generated by the grant flip-flop of block 12-446i, the flip-flop of the corresponding requestor granted the bus cycle is reset causing the resetting of the corresponding requestor ASK flip-flop completing the bus cycle of operation.

The equations for generating each of the above signals are set forth in the Appendix.

DESCRIPTION OF OPERATION

Figure 4A:
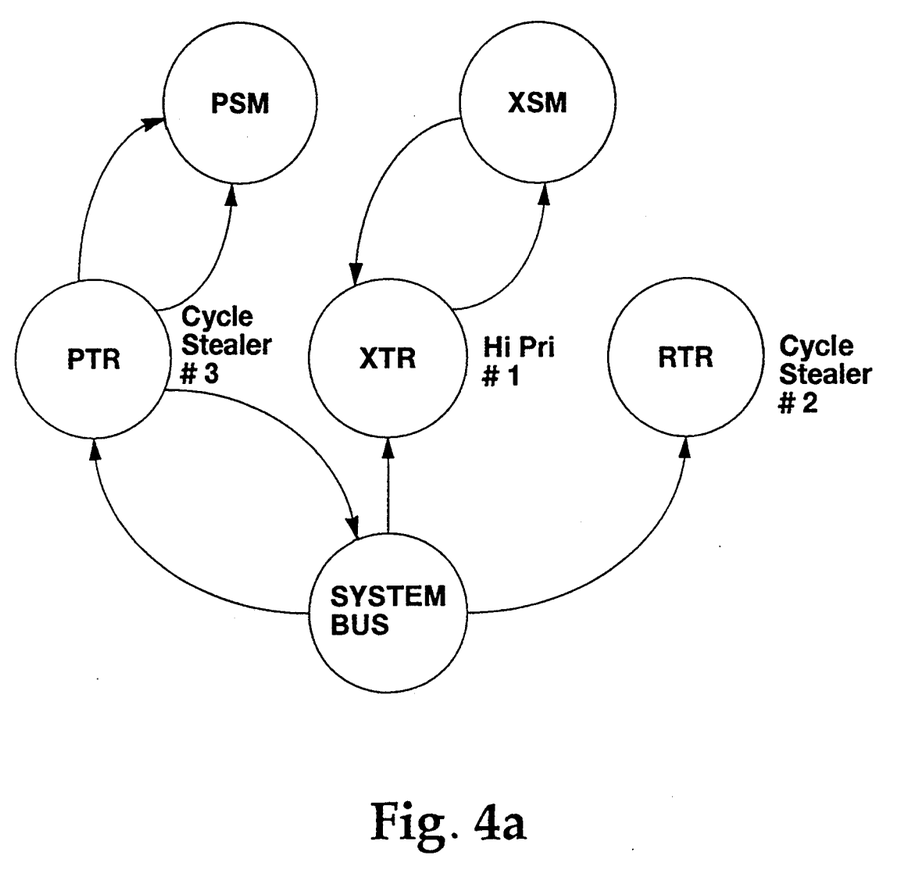
FIGS. 4a and 4b are timing diagrams used to explain the operation of the present invention.

With reference to FIGS. 1 through 3, the operation of the bus interface priority network of the present invention will now be described with reference to FIGS. 4a and 4b. FIG. 4a shows the overall operation of the different requestors in processing different types of transactions requiring access to system bus 16. As indicated, a first type of transaction corresponds to the I/O and memory commands issued by microprocessor 12-20. These commands are loaded into the PTR registers under the control of PSM state machine 12-80 to be thereafter transferred to system bus 16 under the control of the PTR state machine 12-400.

The second type of transaction corresponds to transfers of local memory data made in response to system bus requests to local memory 12-30 from system bus 16. Such data is transferred to the burst array registers 12-58 under the control of XSM state machine 12-66 which is thereafter transferred to system bus 16 under the control of the XTR state machine 12-420 during response bus cycles or second half bus cycles of operation.

The third type of transaction corresponds to the transfers of the contents of system visible registers made in response to I/O commands received from system bus 16. This data is transferred to system bus 16 under the control of RTR state machine 12-440.

As seen from FIG. 4a, these different types of transactions can be taking place simultaneously thereby producing simultaneous requests for access to system bus 16. As indicated in FIG. 4a, as a function of the type of transaction, the requests made by the XTR state machine 12-440 are assigned the top or highest priority while the requests issued by the RTR and PTR state machines 12-420 and 12-400 are assigned the next highest and next lowest priorities, respectively. The PTR and RTR requestors are granted cycles on a cycle stealing basis. That is, a RTR or PTR request is not granted access to system bus 16 unless there is no request being made by the XTR state machine 12-420. The PTR request is only granted access to system bus 16 when there are no requests being made by the XTR and RTR state machines 12-420 and 12-440. This assumes that any other unit on system bus 16 has not generated high priority request signal BSREQH+ in which case none of the state machines will granted access to system bus 16.

Figure 4B:
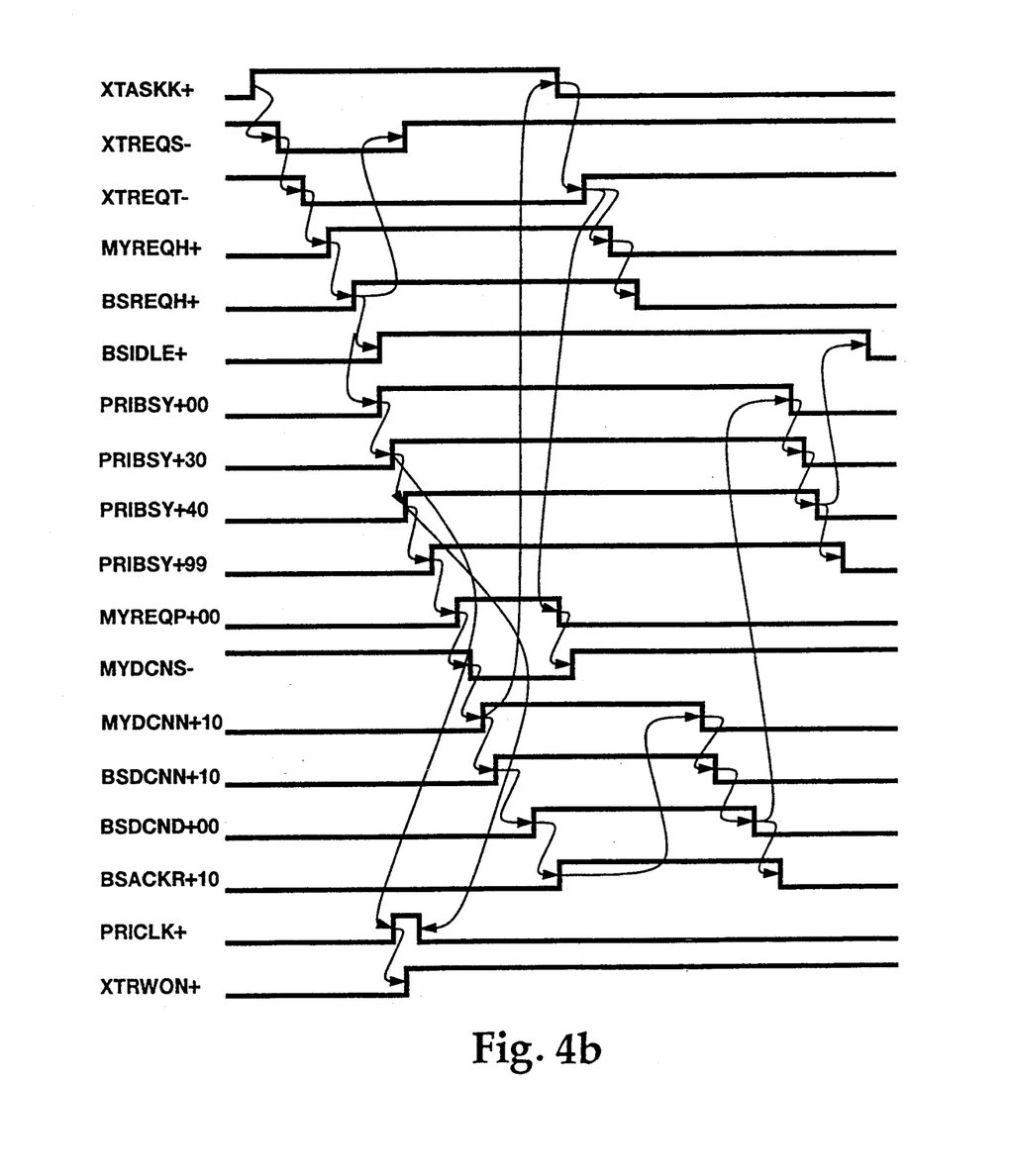

FIG. 4b is a timing diagram illustrating the operation of the system bus priority request circuits 12-446. It is assumed that the XTR state machine 12-420 has received a signal from the XSM state machine 12-66 indicating that data being read from local memory 12-30 is to be transferred to system bus 16. This causes the request generation of signal XTREQP+ which sets a corresponding ASK flip-flop. As seen from FIG. 4b, this results in signal XTASKK+ being switched to a binary ONE state. Signal XTASKK+ when applied as an input to the system bus priority network PAL circuit 12-446b results in the generation of XT request set signal XTREQS−. This signal sets a corresponding one of the request stored flip-flops 12-446d which forces signal XTREQT− to a binary ZERO state.

As seen from FIG. 4b, when system bus 16 is detected to be in an idle state (i.e., signals BSREQH+ and BSREQL+ are both binary ZEROS indicating no other requests), this causes the my request generator PAL circuit 12-446e to force my request pulse signal MYREQH+ to a binary ONE state indicating to the other units connected to system bus 16 that a high priority request has been made. The signal MYREQH+ is used to generate signal BSREQH+ on system bus 16. Signal MYREQH+ also switches bus idle signal BSIDLE+ to the indicated state for signalling that system bus 16 is no longer in an idle state.

As seen from FIG. 4b, signal BSREQH+ causes the PAL circuit priority network 12-446b to generate busy signal PRIBSY+. This signal when applied to delay circuit 12-446c causes the generation of the prinet timing signals PRIBSY+20 through PRIBSY+99, some of which are shown in FIG. 4b. Since the XT state machine 12-420 processes memory type transactions, the delay associated with the type of requestor is 100 nanoseconds. Therefore, after a period of 100 nanoseconds, the my request pulse generator PAL circuit 12-446e generates my request pulse signal MYREQP+ as shown in FIG. 4b. This, in turn, results in the generation of my data cycle now set signal MYDCNS-which causes the common requestor grant flip-flop 12-446i to switch to a binary ONE state resulting in the generation of bus data cycle now signal BSDCNN+.

At this time, the selected transaction address and data are applied to system bus 16. The selection of the requestor is carried out by the system bus address out and data out select PAL circuits of blocks 12-446f and 12-446g, respectively. These circuits are enabled on the leading edge of prinet clock signal PRICLK+ which is generated thirty nanoseconds after signal PRIBSY+ as shown in FIG. 4b. This results in the generation of signal XTRWON, signalling the XTR state machine 12-420 that it has been granted access to system bus 16. Signal XTRWON is also applied to the XT request ask flip-flop of block 12-446a1, causing it to switch reset signal XTASKR− to a binary ONE, in response to signal MYDCNN+. This, in turn, causes the XTASK flip-flop of block 12-446a0 to be reset to a binary ZERO state.

As seen from FIG. 4b, bus data cycle now signal causes the generation of bus data cycle now delayed signal BSDCND+, 60 nanoseconds later which is used to clear the priority network circuits for the next system bus resolution cycle.

Signal BSDCND+ enables the receiving unit to generate bus acknowledge request signal BSACKR+ which causes the resetting of the common requestor grant flip-flop 12-446i as shown in FIG. 4b. This results in the subsequent resetting of priority network busy signal PRIBSY+00 followed by the resetting of the remaining timing signals PRIBSY30 through PRIBSY+99.

In the above example, it was assumed that only the XTR state machine 12-420 generated a request. However, even if requests had been generated by one or both of the state machines 12-400 and 12-440, the result would be the same. That is, the system bus address out and data out select circuits 12-446f and 12-446g would have granted priority to the XTR transaction request, since it is the highest priority requestor. However, if the requestor had been the PTR state machine 12-400 and either the XTR or RTR state machine 12-420 or 12-440 had also generated a request, the system bus address out and data out select circuits would have granted the bus cycle to a requestor other than PTR state machine 12-400, since it is the lowest priority requestor.

From the above, it is seen how flexible the system bus priority network of the present invention is in assigning priorities and in providing the necessary delays for proper system bus access as a function of the type of requestor.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

APPENDIX

I. System Bus Priority Network PAL Circuit 12-446b - XCM26.

II. My Request Pulse Generator PAL Circuit 12-446e - XCM27.

III. System Bus Address Out Select PAL Circuit 12-446f - XCM28.

IV. System Bus Data Out Select PAL Circuit 12-446g - XCM29.

System Bus Priority Network PAL Circuit 12-446b

Description of equation symbols:
(Where # = OR; ! = negation; and & = AND)

MODULE XCM26

(Inputs)

```
BSDCNN      PIN  1;
BSDCND      PIN  2;
BSREQH      PIN  3;
BSREQL      PIN  4;
XTRASKK     PIN  5;
RTASKK      PIN  6;
PTASKK      PIN  7;
!BSDCNB     PIN  8;
PRIBSY20    PIN 11;
PRIBSY30    PIN 13;
PRIBSY40    PIN 14;
PRIBSY50    PIN 23;
```

System Bus Priority Network
PAL Circuit 12-446b - Continued

MODULE XCM26 - Continued (Outputs)

```
!HIREQS    PIN 15;
!XTREQS    PIN 16;
!XTREQR    PIN 17;
!RTREQS    PIN 18;
!RTREQR    PIN 19;
!PTREQS    PIN 20;
!PTREQR    PIN 21;
 PRIBSYO   PIN 22;
```

EQUATES:

```
BSEQT  MACRO {(BSREQH # BSREQL)}
PRIBSY MACRO {(!(BSDCNN # BSDCND) & (BSREQH # BSREQL))}
PRIBSYD MACRO {((!(BSDCNN # BSDCND) & (BSREQH # BSREQL))
               # PRIBSY40)}
BSIDLE MACRO {(!(BSDCNN # BSDCND) & !BSREQH & !BSREQL &
               !PRIBSY40)}
```

EQUATIONS

```
PRIBSYO = PRIBSY;
HIREQS  = !((!BSDCNB & (BSREQH # BSREQL)) # PRIBSY40) &
           BSREQH;
PTREQS  = BSIDLE & PTASKK;
RTREQS  = BSIDLE & RTASKK;
XTREQS  = !PRIBSYD & XTASKK;
PTREQR  = !PTASKK & !PRIBSYD;
RTREQR  = !RTASKK & !PRIBSYD;
XTREQR  = !XTASKK & !PRIBSYD;
```

My Request Pulse Generator PAL Circuit 12-446e

MODULE XCM27

(Inputs)

| | | |
|---|---|---|
| !XTREQT | PIN | 1; |
| !RTREQT | PIN | 2; |
| !PTREQT | PIN | 3; |
| !HIREQT | PIN | 4; |
| PRIBSY20 | PIN | 5; |
| PRIBSY30 | PIN | 6; |
| PRIBSY40 | PIN | 7; |
| PRIBSY50 | PIN | 8; |
| PRIBSY60 | PIN | 9; |
| PRIBSY70 | PIN | 10; |
| PRIBSY80 | PIN | 23; |
| PRIBSY90 | PIN | 13; |
| PRIBSY99 | PIN | 14; |
| BSIUOK | PIN | 11; |

(Outputs)

| | | |
|---|---|---|
| MYREQP | PIN | 15; |
| MYREQH | PIN | 16; |
| MYREQL | PIN | 17; |
| BSMYOK | PIN | 21; |
| PRICLK | PIN | 22; |

EQUATES:

EQUATIONS

MYREQP = (PTREQT # RTREQT) & !HIREQT & !XTREQT &
         PRIBSY60 # XTREQT & PRIBSY99;

BSMYOK = PRIBSY20 & BSIUOK & !(XTREQT # RTREQT & !HIREQT
         # PTREQT & !HIREQT);

My Request Pulse Generator
PAL Circuit 12-446e - Continued

MODULE XCM27 - Continued

PRICLK = PRIBSY30 & !PRIBSY70;

MYREQH = XTREQT;

MYREQL = PTREQT # RTREQT;

System Bus Address Out Select PAL Circuit 12-446f

MODULE XCM28

(Inputs)

```
PRICLK     PIN  1;
!XTREQT    PIN  2;
!RTREQT    PIN  3;
!PTREQT    PIN  4;
 PTMIO     PIN  5;
 X1NEXT    PIN  6;
```

(Outputs)

```
!XTSHEN    PIN 23;
!SHZREN    PIN 22;
!PTMADEN   PIN 21;
!PTIADEN   PIN 20;
!X1SHEN    PIN 19;
!X2SHEN    PIN 18;
 XTRWON    PIN 16;
 RTRWON    PIN 15;
 PTRWON    PIN 14;
```

System Bus Address Out Select PAL Circuit 12-446f - Continued

MODULE XCM28 - Continued

EQUATES:

EQUATIONS

```
XTSHEN   : = XTREQT;
SHZREN   : = XTREQT # RTREQT;
PTMADEN  : = !XTREQT & !RTREQT & PTMIO;
PTIADEN  : = !XTREQT & !RTREQT & !PTMIO;
X1SHEN   : = XTREQT & X1NEXT;
X2SHEN   : = XTREQT & !X1NEXT;
XTRWON   : = XTREQT;
RTRWON   : = !XTREQT & RTREQT;
PTRWON   : = !XTREQT & !RTREQT & PTREQT;
```

System Bus Data Out Select PAL Circuit 12-446g

MODULE XCM29

(Inputs)

```
 PRICLK    PIN  1;
!XTREQT    PIN  2;
!RTREQT    PIN  3;
!PTREQT    PIN  4;
 BURSTA1   PIN  5;
 BURSTA2   PIN  6;
```

(Outputs)

```
!PTDTEN    PIN 23;
!RTSHEN    PIN 22;
!XT0SHEN   PIN 21;
!XT1SHEN   PIN 20;
```

System Bus Data Out Select
PAL Circuit 12-446q - Continued

MODULE XCM29 - Continued

!XT2SHEN    PIN 19;

!XT3SHEN    PIN 18;

EQUATES:

BURSTAD = [BURSTA1,BURSTA2];

EQUATIONS

```
PTDTEN  : = !(XTREQT # RTREQT);
RTSHEN  : = RTREQT & !XTREQT;
XT0SHEN : = XTREQT & (BURSTAD == ^B00);
XT1SHEN : = XTREQT & (BURSTAD == ^B01);
XT2SHEN : = XTREQT & (BURSTAD == ^B10);
XT3SHEN : = XTREQT & (BURSTAD == ^B11);
```

What is claimed is:

1. A bus interface priority network for use on a system which includes a system bus in which requests are asynchronously transferred according to a predetermined bus protocol between a plurality of different types of units which connect to different physical positions along said system bus to access said system bus through a distributed priority network on a priority basis relative to said unit's position on said bus, said interface network being connected to one of said different physical positions and comprising:

an input section coupled to receive requests from a plurality of different types of requestors for processing different types of transactions;

priority network request generator means coupled to said system bus and to said input section for receiving respectively, input bus request signals indicating the presence of a higher priority request on said system bus and input request signals representative of requests from said requestors, said priority network request generator means generating output request signals and a priority network busy signal indicating a start of a bus resolution cycle of operation in response to said input bus request signals, request storage means connected to said priority network generator means, said request storage means storing said input request signals representative of requests received from said different types of requestors for resolution during said bus resolution cycle of operation;

delay generation means coupled to said priority network request generator means for generating a plurality of output delay signals representative of predetermined delay intervals established for said different types of requestors to access said system bus in response to said priority network busy signal; and, request pulse generation means for generating an output bus request signal and being connected to receive said input request signals stored by said request storage means and said plurality of output delay signals from said delay generation means, said request pulse generation means including programmable array logic (PAL) circuit means programmed to select a predetermined one of said output delay signals as a function of which one of said different types of requestors is selected by said PAL circuit means as having the highest priority request according to a predetermined priority scheme for generating said output bus request signal to said distributed priority network for enabling bus access within a minimum access time for each type of transaction being processed by said different requestors sharing common access to said system bus.

2. The bus interface priority network of claim 1 wherein said interface network further includes system address out selection means and data out selection means, each coupled to said request storage means, said request pulse generation means and said system bus, each of said selection means including programming means for resolving according to said predetermined priority scheme which requestor address and data are to be applied to said system bus in the case of simultaneous requests being made by different ones of said plurality of said different types of requestors.

3. The bus interface priority network of claim 2 wherein said different types of requestors generate memory, register and processor requests, and wherein said PAL circuit means and said programming means of each of said selection means are programmed according to said predetermined priority scheme for allocating highest priority to said memory requests, next highest priority to said register requests and lowest priority to processor requests.

4. The bus interface priority network of claim 2 wherein said request pulse generator means includes means for generating a timing signal and said address and data out selection means being connected to receive said timing signal for synchronizing the transfer of request address and data to said system bus with the generation of said output bus request signal.

5. The bus interface priority network of claim 2 wherein said address out selection means connects to each requestor and includes means for applying an output signal for designating which one of said requestors has the highest priority request.

6. The bus interface priority network of claim 1 wherein said interface network includes means for applying said plurality of output delay signals as inputs to said priority network request generator means for producing as said output request signals, sets of glitch free set and reset signals which are applied as inputs to said request storage means.

7. The bus interface priority network of claim 6 wherein said distributed priority network includes a plurality of sections for distributing bus priority network signals among said plurality of units, one of said sections being connected to said request pulse generation means for receiving said output bus request signal, said one of said sections combining said output bus request signal with bus priority network signals received from said system bus for generating a data cycle signal indicating that one of said requestors connected to said bus interface network has been granted the next system bus cycle of operation for transferring a request.

8. The bus interface priority network of claim 7 wherein said input section includes a plurality of storage elements, each connected to a different one of said requestors and said interface network further includes a grant storage element connected to said distributed network section for receiving said data cycle signal, said grant storage element being connected to said input request section and to said system bus, said grant storage element being set to a binary one state in response to said data cycle signal for generating a bus data cycle signal indicating application of said request to said system bus and for resetting one of said plurality of storage elements corresponding to said requestor whose request was applied to said system bus for enabling the processing of a next request.

9. The bus interface priority network of claim 1 wherein said delay generation means includes delay circuits for providing delays having values corresponding to said predetermined delay intervals established for all of the different types of requestors which can be connected to said system bus through said bus interface network.

10. The bus interface priority network of claim 9 wherein said all of said different types of requestors include central processors, memories and controllers.

11. The bus interface priority network of claim 1 wherein said request pulse generation means includes means for selectively generating high priority and low priority bus request signals on said system bus as a function of which one of said requestors was selected as having the highest priority request for indicating that the request being applied to said system bus is from either a high or low priority requestor.

* * * * *